United States Patent [19]
Saitoh et al.

[11] Patent Number: 5,585,961
[45] Date of Patent: Dec. 17, 1996

[54] PHOTOSTRICTIVE DEVICE

[75] Inventors: Susumu Saitoh; Michiko Kametani, both of Tokyo, Japan

[73] Assignee: Kabushiki Kaisha Topcon, Tokyo, Japan

[21] Appl. No.: 509,133

[22] Filed: Jul. 31, 1995

[30] Foreign Application Priority Data

Aug. 2, 1994 [JP] Japan .................................. 6-181356

[51] Int. Cl.$^6$ .................................................... G02F 1/00
[52] U.S. Cl. ........................... 359/323; 359/246; 359/279; 385/4; 385/16; 356/345
[58] Field of Search .................................. 359/323, 245, 359/254, 322, 279, 246; 385/3, 4, 16; 356/345

[56]    References Cited

U.S. PATENT DOCUMENTS

| | | | |
|---|---|---|---|
| 3,997,690 | 12/1976 | Chen | 359/323 |
| 5,050,969 | 9/1991 | Uchino et al. | 359/246 |
| 5,095,515 | 3/1992 | Seaver | 385/16 |
| 5,202,790 | 4/1993 | Uchino et al. | 359/323 |
| 5,383,048 | 1/1995 | Seaver | 359/279 |
| 5,502,781 | 3/1996 | Li et al. | 385/4 |

*Primary Examiner*—Loha Ben
*Attorney, Agent, or Firm*—Haynes and Boone, L.L.P.

[57]    ABSTRACT

In a photostrictive device whose light-irradiated surface is irradiated with a beam of light with a specified wavelength to produce a photostrictive effect, the light-irradiated surface is formed with a surface roughness Ra related to the wavelength of light. This increases the light absorption of the photostrictive device, thereby improving the responsiveness.

5 Claims, 4 Drawing Sheets

PHOTOSTRICTIVE DEVICE

BACKGROUND OF THE INVENTION

1. Field of the Invention

The present invention relates to a photostrictive device for use with an optical actuator and more particularly to a photostrictive device whose surface is improved to enhance its response speed.

2. Prior Art

A PLZT ceramics [(Pb,La)(Zr,Ti)O$_3$] (simply referred to as PLZT) is a ferrodielectric ceramics having a photostrictive effect whereby it extends when it absorbs light, and can convert optical energy directly to mechanical energy.

Recent years have seen major research efforts being made for the development of micromachines. Because it is difficult to use a lead wire to supply electric energy to an actuator, the driving source of the micromachines, it is desired that the energy be supplied remotely to the micromachine actuator without a physical contact.

Hence, expectations are growing that the PLZT, which is a photostrictive device, may be used as an actuator of micromachines by irradiating light against the PLZT to supply energy to the PLZT without physical contact.

The PLZT, when used as the photostrictive device, however, has a response many orders of magnitude slower than when it is normally used as a piezoelectric device that is applied a voltage. This is a major problem that should be addressed before the PLZT can be used as an optical actuator.

FIG. 5 shows the result of experiments conducted by the inventors, in which a specimen of PLZT photostrictive device was irradiated with a specified wavelength of light and in which elongation, current and voltage produced were measured by an electric micrometer, electrometer and electrostatic meter. The elongation of PLZT with the light energy density Ed taken as a parameter changes as shown in FIG. 6(a).

As shown in FIG. 4, the PLZT, upon absorbing light, immediately generates current and voltage and elongates, but the response of elongation is far slower than those of current and voltage.

FIG. 6(b) indicates that although the generated current increases with the light energy density, improving the response of elongation, it saturates at a certain level.

Judging from the above, the elongation of PLZT resulting from absorption of light is a reverse piezoelectric effect caused by the potential difference between the electrode ends. That is, the PLZT elongation is considered to be caused by electrons excited by light absorption moving in the polarization directions.

It is therefore concluded that because the number of electrons excited is limited by the amount of light absorbed by the PLZT, there is a limit to the improvement of response of the PLZT when the response is to be improved simply by increasing the energy density of light to be irradiated.

SUMMARY OF THE INVENTION

A primary object of this invention is to provide a photostrictive device with improved light absorption and response.

The inventors of this invention found through experiments that it is effective in increasing the light absorption and response of the photostrictive device to provide the light-irradiated surface of the photostrictive device with a surface roughness Ra about the wavelength λ of light to be irradiated.

In a photostrictive device, which produces a photostrictive effect when irradiated with light of a specified wavelength, this invention provides the light-irradiated surface of the photostrictive device with a surface roughness Ra (μm) as a means to solve the above-mentioned problem. The surface roughness Ra is given by $$0.85\lambda \leq Ra \leq 1.15\lambda$$

where λ is a wavelength (μm) of the light irradiated.

The surface roughness is set in a range of $0.85\lambda \leq Ra \leq 1.15\lambda$ because the experiments found that the response for other surface roughness is not improved well.

The surface roughness Ra is a parameter defined as an "arithmetic mean roughness." This arithmetic mean roughness is given by the following equation in micrometer (μm).

$$Ra = \frac{1}{l} \int_0^l |f(x)| dx$$

where l is a reference length over which a roughness curve is extracted in the direction of average line and y=f(x) represents the roughness curve, with an X axis taken in the direction of average line of the extracted portion and a Y axis in the direction of vertical magnification. (See JISB0601 and ISO468-1982.)

With this invention, by providing the surface of the photostrictive device with a surface roughness that falls within a predetermined range of the specified wavelength of irradiated light, it is possible to enhance the light absorption efficiency and response.

More detailed objectives and features of this invention will become apparent from the following description and the accompanying drawings.

DETAILED DESCRIPTION OF THE PREFERRED EMBODIMENTS

An example embodiment of the photostrictive device according to this invention will be described by referring to the accompanying drawings.

Figure 1:
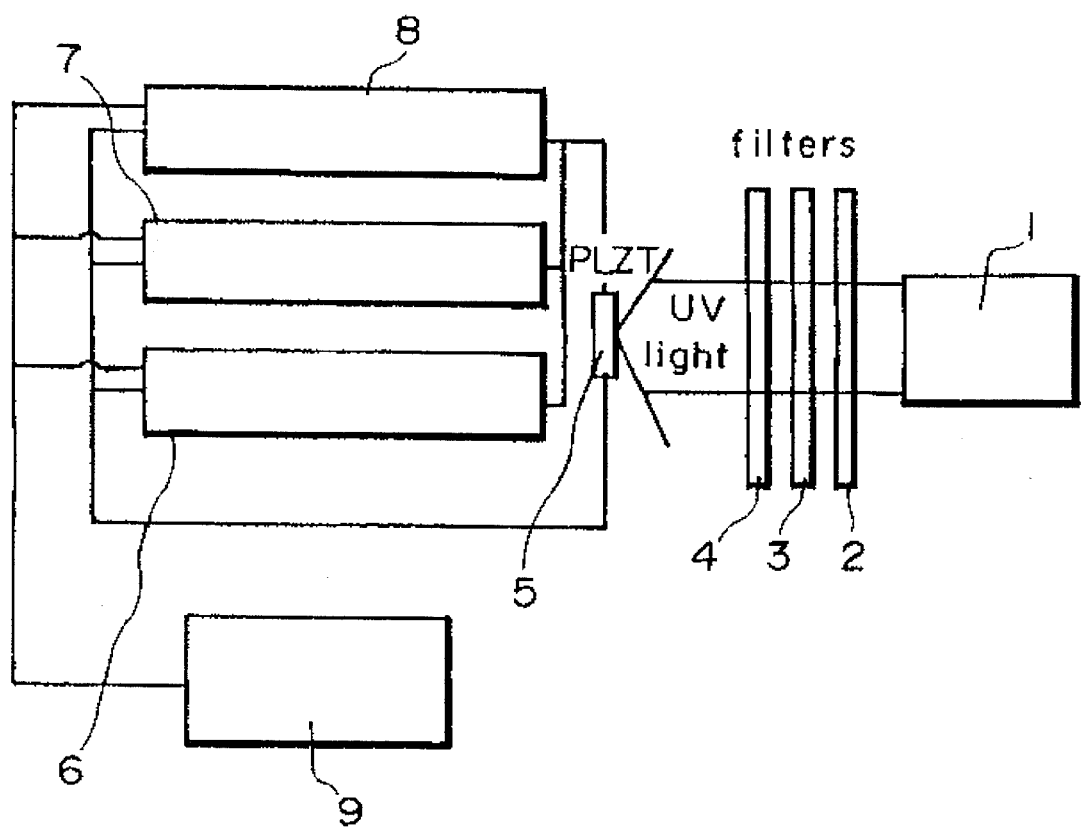
FIG. 1 is a schematic diagram showing a means of measuring the characteristic of the photostrictive device of this invention.

FIG. 1 shows the outline of the equipment for experiment.

In this example, a 500 W mercury lamp is used for a light source 1, which produces light that is passed through an infrared ray cut filter 2 and two band-pass filters 3, 4 to form a parallel beam with a band width of 6 nm and a center wavelength of 365 nm, which is irradiated perpendicularly against a specimen 5 of PLZT, a photostrictive device.

The selection of the center wavelength of 365 nm is based on the report that the light of this wavelength causes the largest displacement in the PLZT. (Refer to K. Uchno, et al., Photostrictive effect in (Pb,La)(Zr,Ti)O$_3$, Ferroelectristics, 64, pp. 199–208 (1985).

The PLZT uses a ferrodielectric of perovskite structure with the composition having a mol ratio of La:Zr:Ti= 3:52:48.

Figure 4:
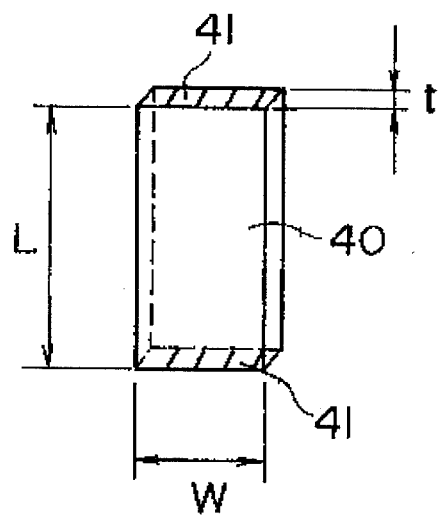
FIG. 4 is a perspective view showing the shape of the PLZT as a specimen.
Figure 5:
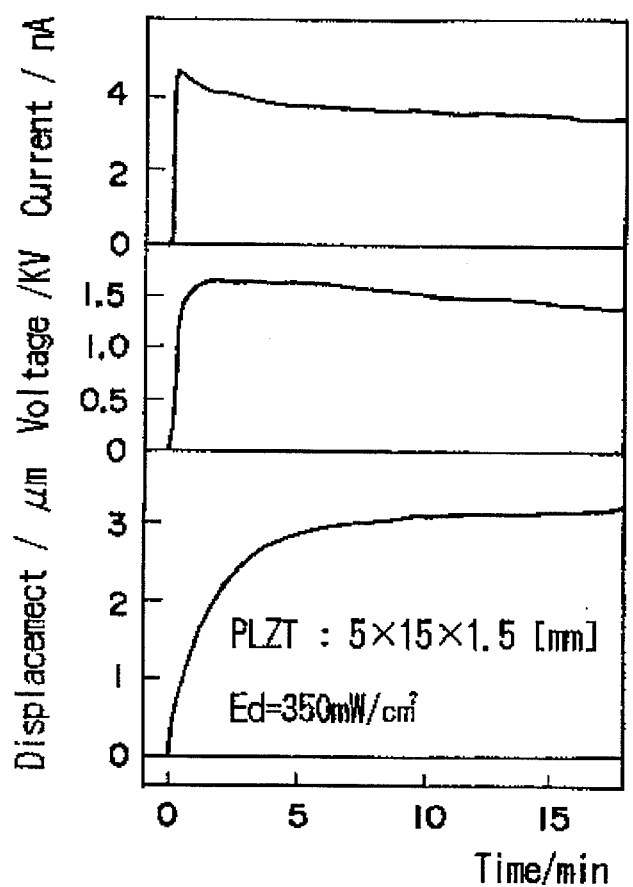
FIG. 5 is a graph showing the relation between the duration that the PLZT is irradiated with light, the elongation of the photostrictive device, and the voltage and current generated.
Figure 6A:
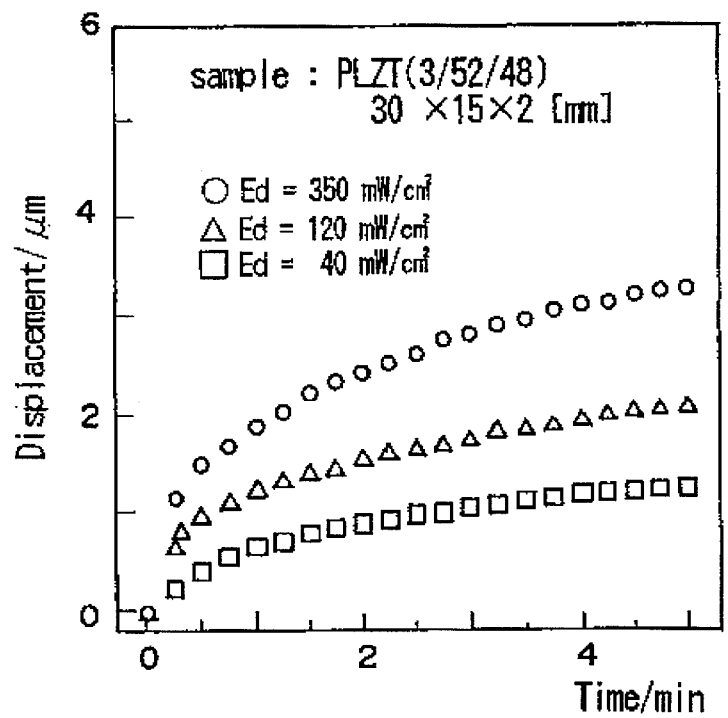
FIG. 6a is a graph showing the relation between the duration that the PLZT is irradiated with light and the elongation of the photorestrictive device.
Figure 6B:
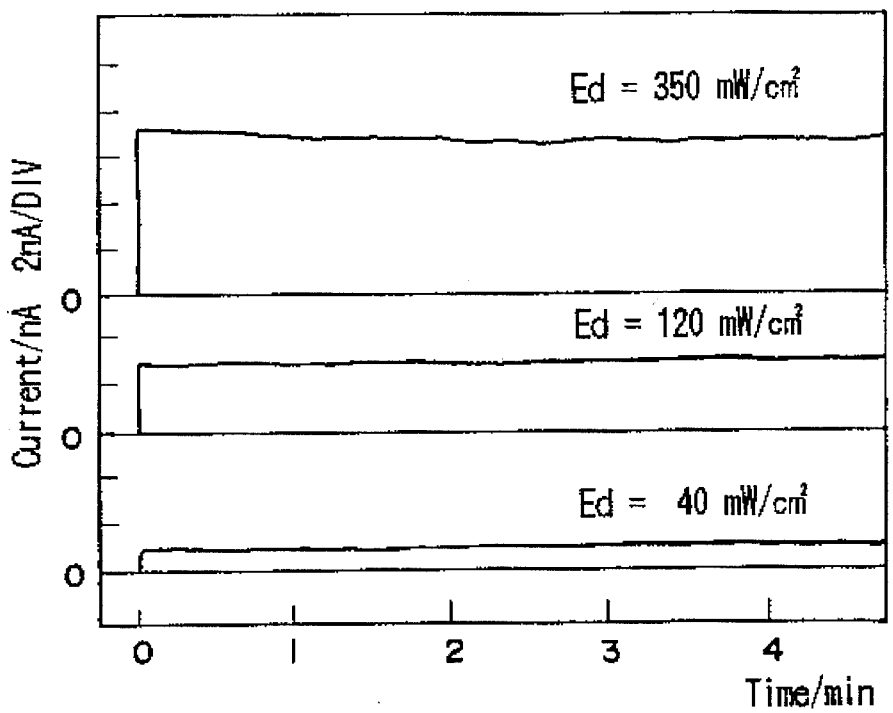
FIG. 6b is a graph showing the current generated when the energy density of the irradiated light is changed.

The specimens 40 of PLZT used in the experiment are cut to 30 mm in longitudinal size L, 15 mm in width size W and 1.5, 2.0 and 3.0 mm in thickness t, and also to 5 mm in L, 15 mm in W and 1.5 mm in t, as shown in FIG. 4. These specimens 40 are provided with a surface roughness Ra over the light-irradiated surface (L 30 mm×W 15 mm, and L 5 mm×W 15 mm).

When, for example, the surface roughness is to be set at Ra=420 nm, the light-irradiated surface of the mirror-finished PLZT specimen is polished on the glass base by using powdered aluminum oxide (Al$_2$O$_3$) of grain No. 800 to 1000 and water. The surface roughness was measured with a probe type surface roughness measuring device and it was confirmed that the surface roughness was within the specified range.

End surfaces (surfaces having a width W×thickness t) of the specimen 40 with respect to the longitudinal direction L are silver-printed to form electrodes 41, 41; and end surfaces (surfaces having a longitudinal length L×thickness t) with respect to the width direction W are subjected to the polarizing processing at 10 kV/cm in 135° C. silicone oil for three minutes.

In this embodiment, measurement is taken of the elongation, current and voltage generated when a beam with a wavelength of 365 nm is irradiated against the specimen 5 of PLZT as shown in FIG. 1 (in FIG. 4, 40). The measuring devices include an electric micrometer 6, electrometer 7 and electrostatic meter 8. The measured data was plotted by an X-Y plotter or displayed on a data display 9 such as person computer.

The electric micrometer 6 and the PLZT specimen 5 are insulated from each other by Bakelite to prevent leakage of electric charge.

Figure 2:
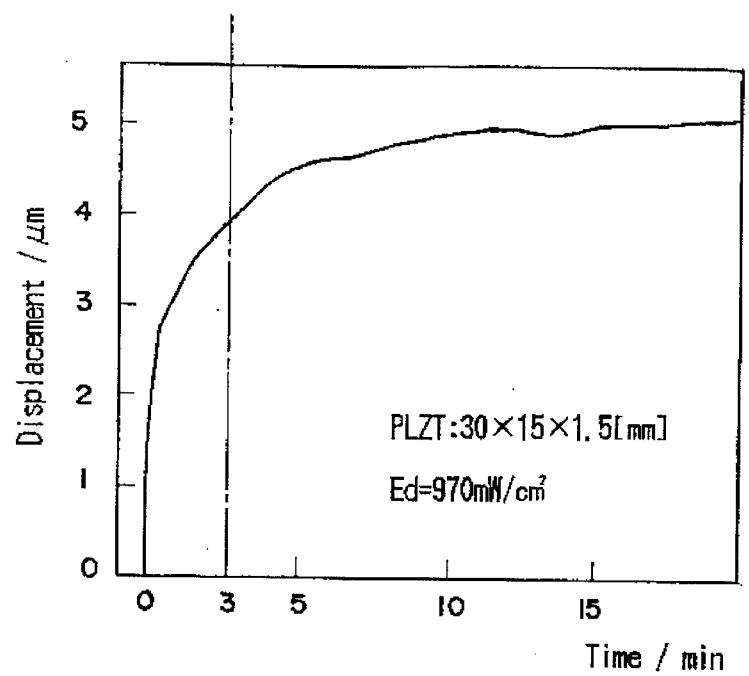
FIG. 2 is a graph showing the relation between the duration that light is irradiated against the PLZT and the elongation of the PLZT.

Here, based on the typical change with time of the PLZT elongation shown in FIG. 2, we will describe the method of evaluating the responsiveness of the device.

FIG. 2 shows that at the initial period of light irradiation, the PLZT exhibits a sharp elongation but the rate of increase of elongation decreases with elapse of time. The actuator material should ideally exhibit a large elongation at the initial period of light irradiation and extend linearly. The several minutes including the rising edge at the starting period of irradiation is considered as the range that can be used for the actuator. In this embodiment, therefore, the responsiveness is evaluated based on the amount of change that occurs during a specified period of time (three minutes) after light irradiation.

Figure 3:
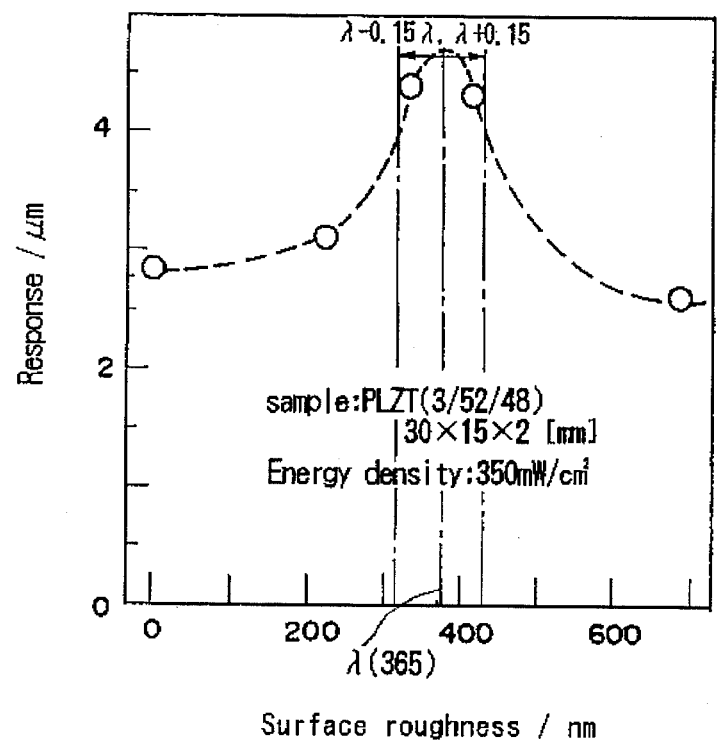
FIG. 3 is a graph showing the relation between the response of the PLZT of the embodiment when it is irradiated with light and its surface roughness.

FIG. 3 shows the responsiveness of the PLZTs with differing surface roughnesses 8 nm, 240 nm, 340 nm, 420 nm and 690 nm provided to their light-irradiated surfaces. The PLZT specimen is 30-mm long, 15-mm wide and 2.0mm thick and the energy density of the irradiated light with a wavelength of 365 nm is 350 mW/cm$^2$. Ra is a parameter representing the average surface roughness.

The result of this experiment shows that the surface roughness of 340–420 nm including the same surface roughness as the wavelength of 365 nm of the irradiated light produced the best responsiveness and resulted in good light absorption. The surface roughness outside this range resulted in slower responses to light.

From this graph, the upper limit of the practical surface roughness Ra as related to the wavelength of light $\lambda$ is determined as follows. From (420−365)/365=0.15, $$\text{Surface roughness } Ra \leq (1+0.15)\lambda.$$

Similarly, the lower limit is determined as follows. Using the same value of 0.15, we get $$(1-0.15)\lambda \leq \text{surface roughness } Ra.$$

Hence, the responsiveness can be improved by providing the light-irradiated surface with the following surface roughness Ra as related with the specified wavelength $\lambda$ $$0.85\lambda \leq Ra \leq 1.15\lambda.$$

We claim:
1. A photostrictive device comprising:
  a light-irradiated surface which is irradiated with a beam of light with a specified wavelength $\lambda$ to produce a photostrictive effect;
  wherein the light-irradiated surface is provided with a surface roughness Ra defines as

$$0.85\lambda \leq Ra \leq 1.15\lambda$$

2. A photostrictive device according to claim 1 wherein the specified wavelength $\lambda$ is 365 nm.
3. A photostrictive device according to claim 1 or 2 wherein the photostrictive device is a PLZT.
4. A photostrictive device according to claim 3 wherein the PLZT is a ferrodielectric of perovskite structure having a composition with a mol ratio of La:Zr:Ti=3:52:48.
5. A photostrictive device according to claim 3 wherein the light-irradiated surface of a mirror-finished PLZT specimen is polished on a glass base by using powdered aluminum oxide (Al$_2$O$_3$) with grain No. 800 to 1000 and water, and is provided with a specified surface roughness Ra.

* * * * *